United States Patent
Seo et al.

(10) Patent No.: US 10,622,610 B2
(45) Date of Patent: Apr. 14, 2020

(54) CELL MODULE ASSEMBLY HAVING IMPROVED SAFETY AND PACK STRUCTURE FOR THE CELL MODULE ASSEMBLY

(71) Applicant: LG Chem, Ltd., Seoul (KR)

(72) Inventors: Sung-Won Seo, Daejeon (KR); Jeong-O Mun, Daejeon (KR); Jong-Ha Jeong, Daejeon (KR); Jong-Woon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 58 days.

(21) Appl. No.: 16/060,278

(22) PCT Filed: Jul. 7, 2017

(86) PCT No.: PCT/KR2017/007326
§ 371 (c)(1),
(2) Date: Jun. 7, 2018

(87) PCT Pub. No.: WO2018/009039
PCT Pub. Date: Jan. 11, 2018

(65) Prior Publication Data
US 2018/0358593 A1    Dec. 13, 2018

(30) Foreign Application Priority Data
Jul. 8, 2016   (KR) .................. 10-2016-0086899

(51) Int. Cl.
*H01M 2/12*   (2006.01)
*H01M 2/10*   (2006.01)
*H01M 2/34*   (2006.01)

(52) U.S. Cl.
CPC ............. *H01M 2/127* (2013.01); *H01M 2/10* (2013.01); *H01M 2/1077* (2013.01); *H01M 2/12* (2013.01); *H01M 2/34* (2013.01); *H01M 2200/00* (2013.01)

(58) Field of Classification Search
None
See application file for complete search history.

(56) References Cited

U.S. PATENT DOCUMENTS

| | | |
|---|---|---|
| 8,652,666 B2 | 2/2014 | Kim |
| 9,318,731 B2 | 4/2016 | Lee et al. |

(Continued)

FOREIGN PATENT DOCUMENTS

| | | |
|---|---|---|
| EP | 2497132 A1 | 9/2012 |
| EP | 2738834 A1 | 6/2014 |

(Continued)

OTHER PUBLICATIONS

International Search Report and Written Opinion for Application No. PCT/KR2017/007326, dated Oct. 26, 2017 (13 pages); with partial English translation.

*Primary Examiner* — Wyatt P Mcconnell
(74) *Attorney, Agent, or Firm* — Morgan, Lewis & Bockius LLP

(57) ABSTRACT

Provided is a cell module assembly including: a plurality of cell modules arranged at a predetermined interval; and a pack structure including a pack tray that supports the plurality of cell modules and in which a passage is formed, wherein at least one first venting hole is formed in each of the plurality of cell modules, and a second venting hole matched to the at least one first venting hole and communicating with the passage is formed in the pack tray.

19 Claims, 3 Drawing Sheets

(56) References Cited

U.S. PATENT DOCUMENTS

| | | | | |
|---|---|---|---|---|
| 2013/0059175 A1* | 3/2013 | Engel | ............... | H01M 2/12 |
| | | | | 429/50 |
| 2016/0233465 A1* | 8/2016 | Lee | ............... | H01M 10/653 |
| 2016/0301043 A1 | 10/2016 | Morisaku et al. | | |

FOREIGN PATENT DOCUMENTS

| | | |
|---|---|---|
| JP | 59-14828 B2 | 4/1984 |
| JP | 2007-012486 A | 1/2007 |
| JP | 2007-027011 A | 2/2007 |
| JP | 2015-109176 A | 6/2015 |
| KR | 10-2011-0055371 A | 5/2011 |
| KR | 10-2012-0119407 A | 10/2012 |
| KR | 10-2014-0002115 A | 1/2014 |
| KR | 10-2015-0065964 A | 6/2015 |
| WO | 2014/003474 A1 | 1/2014 |
| WO | WO-2016017983 A1 * 2/2016 .......... H01M 10/653 |  |

* cited by examiner

CELL MODULE ASSEMBLY HAVING IMPROVED SAFETY AND PACK STRUCTURE FOR THE CELL MODULE ASSEMBLY

TECHNICAL FIELD

The present application claims priority to Korean Patent Application No. 10-2016-0086899 filed on Jul. 8, 2016 in the Republic of Korea, the disclosure of which is incorporated herein by reference.

The present disclosure relates to a cell module assembly, and more particularly, to a cell module assembly having a structure that may prevent a venting gas or a flame from diffusing to adjacent modules when an event occurs in a cell module.

BACKGROUND

A lithium secondary battery pack is made by combining a plurality of unit cells into one pack and is widely used in applications requiring high energy such as a vehicle battery or an electric power storage device.

However, a battery pack including a plurality of unit cells generates heat and swells up during overcharging, and thus is deformed such that a module expands outward. In a severe case, a flame is discharged to the outside of the module. Also, a venting gas or a flame generated in a cell module may diffuse to cell modules adjacent to the cell module, thereby leading to an additional event.

In relation to technology for guaranteeing the safety of a cell module, Korean Patent Publication No. 2014-0002115 discloses a battery pack in which a gas discharging part communicating with a gas collecting part is formed in an upper cap, and Korean Patent Publication No. 2015-0065964 discloses a battery module and a battery pack having one pair of cases having gas discharging holes formed in side surfaces at positions corresponding to electrode tabs of pouch cells.

Korean Patent Publication No. 2014-0002115 discloses a battery pack including: a plurality of stacked battery modules received in a battery pack case, including: a first electrode assembly and a second electrode assembly having electrode tabs including an anode tab and a cathode tab formed to be extended from an anode plate and a cathode plate and sealed by a pouch so that the electrode tab is exposed to the outside; a battery case having one side opened in a height direction so that the first electrode assembly and the second electrode assembly are received therein; a connection mold inserted between the electrode tabs of the first electrode assembly and the second electrode assembly and the pouch to thereby connect a plurality of terminals formed on one side to the electrode tabs, and including a gas collection part formed so as to be penetrated in a height direction; and an upper cap coupled to the connection mold at the opened side of the battery case and having a gas discharging part formed therein communicating with the gas collection part; and a gas guide pipe formed to be extended in a length direction so as to be communicated with the gas discharging part of the battery module.

Korean Patent Publication No. 2015-0065964 discloses a battery module including a pouch cell in which an electrode tab is formed at one side or both sides of an electrode body; one pair of case each coupled to surround an outer surface of the pouch cell and comprising a receiving part in which the electrode body of the pouch cell is inserted and received, an opening part through which the receiving part is exposed, a terminal groove through which an electrode terminal coupled to the electrode tab of the pouch cell is withdrawn to the outside, and a gas discharging hole formed in a side surface at a position corresponding to the electrode tab of the pouch cell; one pair of heat dissipation plates respectively coupled to outer surfaces of the one pair of cases and surrounding the opening parts; and an insulating sheet located between the electrode body of the pouch cell and the heat dissipation plates.

However, in a related art battery pack or a related art battery module having a structure in which a cell module array 10 including a plurality of cell modules 10a through 10c in a predetermined pack structure 30 contacts a heat sink 20 as shown in FIG. 1, when an event occurs due to overcharging of a cell module (e.g., the cell module 10a), a venting gas or a flame may diffuse and an additional event may occur. Conventional patent documents have not disclosed technology for solving these problems, and thus there is a demand for the technology.

SUMMARY

The present disclosure is designed to solve the problems of the related art, and therefore the present disclosure is directed to providing a cell module assembly having a structure for preventing occurrence of an additional event when an event occurs in a cell module and a venting gas or a flame diffuses to cell modules adjacent to the cell module, and a pack structure for the cell module assembly.

In one aspect of the present disclosure, there is provided a cell module assembly including: a plurality of cell modules arranged at a predetermined interval; and a pack structure including a pack tray that supports the plurality of cell modules and in which a passage is formed, wherein at least one first venting hole is formed in each of the plurality of cell modules, and a second venting hole matched to the at least one first venting hole and communicating with the passage is formed in the pack tray.

A sealing material may be applied along edges of a bottom surface of each of the plurality of cell modules so that each of the plurality of cell modules is adhered to the pack tray.

A sealing material may be applied along edges of side surfaces of the plurality of cell modules so that adjacent cell modules are adhered to each other.

The at least one first venting hole may be formed in a bottom surface of one end or both ends of each of the plurality of cell modules in a longitudinal direction of each of the plurality of cell modules.

The cell module assembly may further include a heat sink located between the plurality of cell modules and the pack tray and contacting the plurality of cell modules, wherein a third venting hole matched to the at least one first venting hole and the second venting hole is formed in the heat sink.

The pack tray may include a first plate contacting the heat sink and a second plate located under the first plate, wherein the passage is formed due to a gap between the first plate and the second plate.

The second venting hole may be formed in the first plate.

The passage extends to the outside of the pack structure.

In another aspect of the present disclosure, there is also provided a pack structure including a pack tray having a support surface for supporting a cell module having a bottom surface in which a first venting hole is formed, wherein the pack tray includes: a second venting hole matched to the first venting hole; and a passage communicating with the second venting hole and discharging outward a venting gas and a flame that flow through the first venting hole and the second venting hole.

The pack structure may further include a heat sink located between the cell module and the pack tray and contacting the cell module, wherein a third venting hole matched to the first venting hole and the second venting hole is formed in the heat sink.

The pack tray may include a first plate contacting the heat sink and a second plate located under the first plate, wherein the passage is formed due to a gap between the first plate and the second plate.

The second venting hole may be formed in the first plate.

The first venting hole may be formed in a bottom surface of one end or both ends of the cell module in a longitudinal direction of the cell module, and the second venting hole may be formed to correspond to the first venting hole.

In another aspect of the present disclosure, there is also provided a cell module provided in a pack tray provided in a pack structure, wherein a first venting hole is formed in a bottom surface of one end or both ends of a module body in a longitudinal direction of the module body and a venting gas and a flame are discharged into the pack tray.

According to the present disclosure, when an event occurs in a cell module, since a venting gas or a flame may be discharged to the outside through a pack tray without affecting cell modules adjacent to the cell module, the safety of a cell assembly may be improved.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Figure 2:
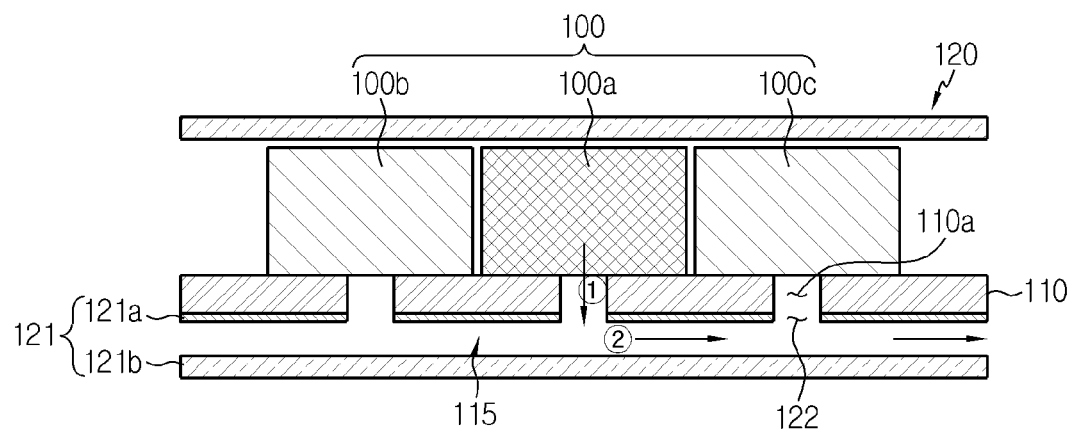
FIG. 2 is a front view illustrating a configuration and an operation of a cell module assembly according to the present disclosure.
Figure 3:
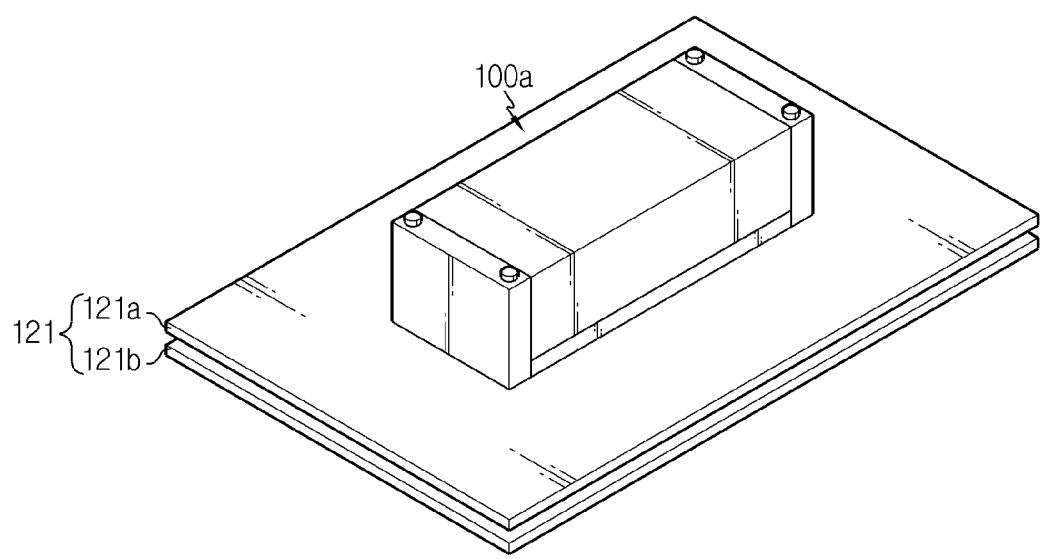
FIG. 3 is a perspective view illustrating an outer appearance of the cell module assembly according to a preferred embodiment of the present disclosure.
Figure 4:
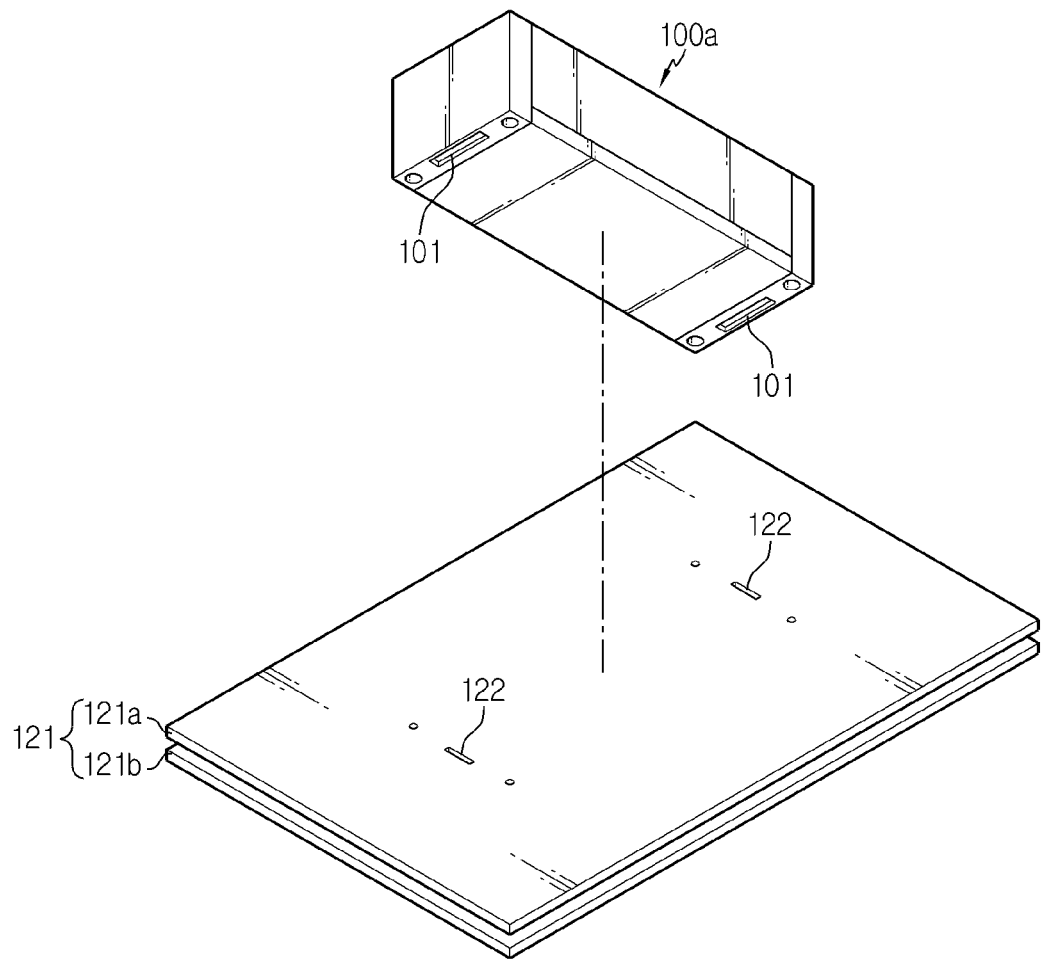
FIG. 4 is an exploded perspective view of FIG. 3.
Figure 5:
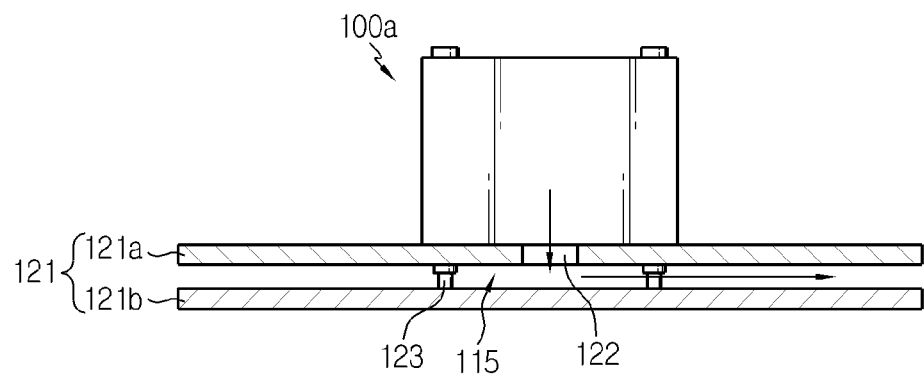
FIG. 5 is a front view of FIG. 3.

FIG. 2 is a front view illustrating a configuration and an operation of a cell module assembly according to the present disclosure. FIG. 3 is a perspective view illustrating an outer appearance of the cell module assembly according to a preferred embodiment of the present disclosure. FIG. 4 is an exploded perspective view of FIG. 3. FIG. 5 is a front view of FIG. 3.

Referring to FIGS. 2 through 5, the cell module assembly according to the present disclosure includes a cell module array 100 including a plurality of cell modules 100a, 100b, and 100c arranged at a predetermined interval, a pack structure 120 having a predetermined shape and receiving the cell modules 100a, 100b, and 100c, and a pack tray 121 located in the pack structure 120.

A plurality of cells each having a main body having a thin plate shape, preferably, pouch-type secondary battery cells, are provided in each of the cell modules 100a, 100b, and 100c. The plurality of cells are arranged at a predetermined interval in a main body of each of the cell modules 100a, 100b, and 100c to form a stacked structure.

At least one first venting hole 101 (see FIG. 4) is formed in each of the cell modules 100a, 100b, and 100c, and a second venting hole 122 matched to the first venting hole 101 and communicating with a passage 115 is formed in the pack tray 121.

The at least one first venting hole 101 is formed in a bottom surface of one end or both ends of each of the cell modules 100a, 100b, and 100c in a longitudinal direction of each of the cell modules 100a, 100b, and 100c to have a predetermined shape. In order to improve venting efficiency in a limited space, it is preferable that the first venting hole 101 is a long hole.

A sealing material is applied along edges of a bottom surface of each of the cell modules 100a, 100b, and 100c so that each of the cell modules 100a, 100b, and 100c is adhered to the pack array 121. Accordingly, a venting gas or a flame may be prevented from leaking to adjacent cell modules through an interface between each of the cell modules 100a, 100b, and 100c and the pack tray 121.

In addition, a sealing material may be applied along edges of side surfaces of the cell modules 100a, 100b, and 100c so that adjacent cell modules are closely coupled to each other. Accordingly, the flow of a flame or a venting gas between adjacent cell modules may be more effectively prevented.

A heat sink 110 contacting the cell modules 100a, 100b, and 100c may be added between the cell modules 100a, 100b, and 100c and the pack tray 121. A third venting hole 110a matched to the first venting hole 101 and the second venting hole 122 is formed in the heat sink 110.

The pack structure 120 includes the pack tray 121 that supports the plurality of cell modules 100a, 100b, and 100c and in which the passage 115 is formed. The pack tray 121 includes a first plate 121a contacting the heat sink 110 and a second plate 121b located under the first plate 121a and spaced apart by a predetermined interval from the first plate 121a.

It is preferable that the passage 115 formed in the pack tray 121 is formed due to a gap between the first plate 121a and the second plate 121b. It is preferable that the gap between the first plate 121a and the second plate 121b is maintained by a support member 123 as shown in FIG. 5.

The passage 115 formed between the first plate 121a and the second plate 121b extends to the outside of the pack structure 120 along a predetermined discharge path.

When an event due to overcharging or the like occurs in any one cell module (e.g., the cell module 100a), the cell module assembly constructed as described above may prevent a venting gas or a flame from flowing to the cell modules 100b and 110c adjacent to the cell module 100a.

Figure 1:
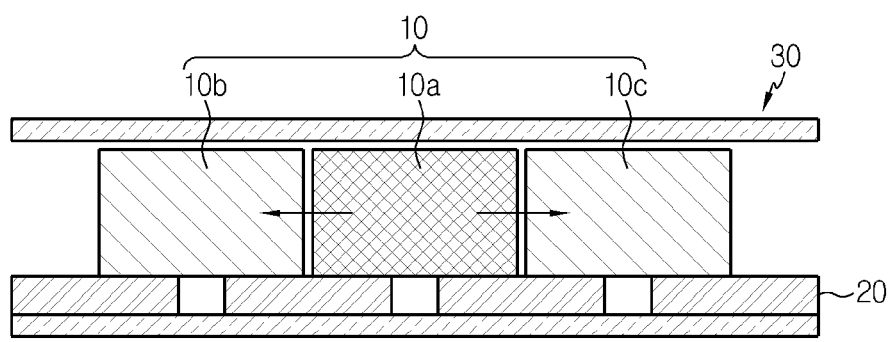
FIG. 1 is a front view of a cell module assembly according to the related art.

That is, since a venting gas or a flame generated in any one cell module (e.g., the cell module 100a) is discharged through the first venting hole 101 formed in the cell module 100a, flows through the third venting hole 110a and the second venting hole 122 matched to the first venting hole 101 as marked by an arrow ① of FIG. 1, enters the passage 115 formed in the pack tray 121, horizontally flows through the passage 115 as marked by an arrow ②, and then is discharged to the outside of the pack tray 121, an additional event may be prevented from occurring in the cell modules 100b and 100c adjacent to the cell module 100a.

As described above, when an event occurs in an arbitrary cell module, since a venting gas or a flame may be discharged to the outside of a pack structure without affecting adjacent cell modules, the safety of a cell assembly may be significantly improved.

According to the present disclosure, there may be provided a cell assembly that may prevent a venting gas or a flame from diffusing to adjacent cell modules and may improve safety.

What is claimed is:

1. A cell module assembly, comprising:
a plurality of cell modules arranged at a predetermined interval, wherein each of the plurality of cell modules includes a plurality of battery cells;
a pack structure comprising a pack tray that supports the plurality of cell modules and in which a passage is formed;
a first venting hole formed in a bottom surface only at one end or both ends of each of the plurality of cell modules; and
a second venting hole formed in the pack tray to be matched to the first venting hole and communicating with the passage.

2. The cell module assembly of claim 1, wherein a sealing material is applied along edges of a bottom surface of each of the plurality of cell modules so that each of the plurality of cell modules is adhered to the pack tray.

3. The cell module assembly of claim 2, wherein a sealing material is applied along edges of side surfaces of the plurality of cell modules so that adjacent cell modules are adhered to each other.

4. The cell module assembly of claim 1, wherein the first venting hole is formed in a longitudinal direction of each of the plurality of cell modules.

5. The cell module assembly of claim 1, further comprising a heat sink located between the plurality of cell modules and the pack tray and contacting the plurality of cell modules, wherein a third venting hole matched to the first venting hole and the second venting hole is formed in the heat sink.

6. The cell module assembly of claim 5, wherein the pack tray comprises a first plate contacting the heat sink and a second plate located under the first plate,
wherein the passage is formed due to a gap between the first plate and the second plate.

7. The cell module assembly of claim 6, wherein the second venting hole is formed in the first plate.

8. The cell module assembly of claim 6, wherein the passage extends to the outside of the pack structure.

9. A pack structure, comprising:
a pack tray having a support surface for supporting a cell module including a plurality of battery cells and having a bottom surface in which a first venting hole is formed, wherein the pack tray includes:
a second venting hole matched to the first venting hole; and
a passage communicating with the second venting hole and discharging outward a venting gas and a flame that flow through the first venting hole and the second venting hole,
wherein the first venting hole is formed in the bottom surface only at one end or both ends of the cell module.

10. The pack structure of claim 9, further comprising a heat sink located between the cell module and the pack tray and contacting the cell module, wherein a third venting hole matched to the first venting hole and the second venting hole is formed in the heat sink.

11. The pack structure of claim 10, wherein the pack tray comprises a first plate contacting the heat sink and a second plate located under the first plate,
wherein the passage is formed due to a gap between the first plate and the second plate.

12. The pack structure of claim 11, wherein the second venting hole is formed in the first plate.

13. The pack structure of claim 12, wherein the first venting hole is formed in in a longitudinal direction of the cell module, and
the second venting hole is formed to correspond to the first venting hole.

14. The pack structure of claim 11, wherein the passage extends to the outside of the pack structure.

15. A cell module provided in a pack tray provided in a pack structure,
wherein a first venting hole is formed in a bottom surface only at one end or both ends of a module body in a longitudinal direction of the module body and a venting gas and a flame are discharged into the pack tray,
wherein the cell module includes a plurality of battery cells.

16. The cell module assembly of claim 1, wherein each of the battery cells in each of the cell modules is a pouch-type battery cell.

17. The cell module assembly of claim 1, wherein the bottom surface of each of the cell modules includes no venting hole other than the first venting hole.

18. The pack structure of claim 9, wherein the bottom surface of the cell module includes no venting hole other than the first venting hole.

19. The cell module of claim 15, wherein the bottom surface of the module body includes no venting hole other than the first venting hole.

* * * * *